(12) United States Patent
Ouyang et al.

(10) Patent No.: US 10,426,143 B2
(45) Date of Patent: Oct. 1, 2019

(54) SYSTEMS AND METHODS FOR LARVAL FISH ENUMERATION AND GROWTH MONITORING

(71) Applicant: Florida Atlantic University Board of Trustees, Boca Raton, FL (US)

(72) Inventors: Bing Ouyang, Vero Beach, FL (US);
Paul S. Wills, Vero Beach, FL (US);
Fraser Dalgleish, Vero Beach, FL (US);
Anni Dalgleish, Vero Beach, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 121 days.

(21) Appl. No.: 15/877,941

(22) Filed: Jan. 23, 2018

(65) Prior Publication Data
US 2018/0213753 A1    Aug. 2, 2018

Related U.S. Application Data

(60) Provisional application No. 62/452,595, filed on Jan. 31, 2017.

(51) Int. Cl.
*A01K 61/90*        (2017.01)
*A01K 61/95*        (2017.01)
(Continued)

(52) U.S. Cl.
CPC .............. *A01K 61/95* (2017.01); *A01K 61/10* (2017.01); *A01K 61/90* (2017.01); *A01K 63/06* (2013.01);
(Continued)

(58) Field of Classification Search
CPC ........ A01K 61/95; A01K 61/90; A01K 61/10; A01K 63/06; G06T 7/174; G06T 7/11;
(Continued)

(56) References Cited

U.S. PATENT DOCUMENTS

2012/0046203 A1* 2/2012 Walsh ................ A61B 5/15186
506/39

OTHER PUBLICATIONS

Liu, Zhi, Weiwei Li, Liquan Shen, Zhongmin Han, and Zhaoyang Zhang. "Automatic segmentation of focused objects from images with low depth of field." Pattern Recognition Letters 31, No. 7 (2010): 572-581. (Year: 2010).*

(Continued)

*Primary Examiner* — Carol Wang
(74) *Attorney, Agent, or Firm* — Fox Rothschild LLP

(57) ABSTRACT

Systems and methods for object enumeration in a culture tank. The methods comprise: obtaining an array of two dimensional images of an illuminated scene in a culture tank; correcting non-uniform background illumination in the two dimensional images; improving a color contrast between a background and object edges shown in the two dimensional images; performing a defocus analysis using the two dimensional images to generate a focus map image; generating a modified focus map image by eliminating isolated spots shown in the focus map image and merging relatively small spots with adjacent relatively large objects in the focus map image; classifying each object shown in the modified focus map image as an object of interest or an object of no interest; and counting the number of objects classified as objects of interest.

18 Claims, 9 Drawing Sheets

(51) Int. Cl.
  *G06K 9/00*   (2006.01)
  *G06K 9/20*   (2006.01)
  *G06T 7/62*   (2017.01)
  *A01K 61/10*  (2017.01)
  *A01K 63/06*  (2006.01)
  *G06K 9/36*   (2006.01)
  *G06T 5/00*   (2006.01)
  *G06T 7/11*   (2017.01)
  *G06T 7/174*  (2017.01)

(52) U.S. Cl.
  CPC ....... *G06K 9/0014* (2013.01); *G06K 9/00147* (2013.01); *G06K 9/00771* (2013.01); *G06K 9/209* (2013.01); *G06K 9/2054* (2013.01); *G06K 9/36* (2013.01); *G06T 5/003* (2013.01); *G06T 5/007* (2013.01); *G06T 7/11* (2017.01); *G06T 7/174* (2017.01); *G06T 7/62* (2017.01); *G06T 5/009* (2013.01); *G06T 2200/21* (2013.01); *G06T 2207/10024* (2013.01); *G06T 2207/10052* (2013.01); *G06T 2207/20192* (2013.01); *G06T 2207/20208* (2013.01); *G06T 2207/30128* (2013.01); *G06T 2207/30242* (2013.01)

(58) Field of Classification Search
  CPC .......... G06T 7/62; G06T 5/007; G06T 5/003; G06T 5/009; G06T 2207/30242; G06T 2207/30128; G06T 2207/10052; G06T 2207/20208; G06T 2207/10024; G06T 2207/20192; G06T 2200/21; G06K 9/00771; G06K 9/36; G06K 9/00147; G06K 9/2054; G06K 9/209; G06K 9/0014
  See application file for complete search history.

(56) References Cited

OTHER PUBLICATIONS

Patel, P.M., et al., "Image Segmentation Using K-Mean Clustering for Finding Tumor in Medical Application," International Journal of Computer Trends and Technology (IJCTT)I vol. 4, Issue 5, May 2013.

Fries, R.W., et al., "Image Enhancement by Stochastic Homomorphic Filtering," IEEE Transactions on Acoustics, Speech, and Signal Processing, vol. ASSP-27, No. 6, Dec. 1979.

Otsu, N., "A Threshold Selection Method from Gray-Level Histograms," IEE Transations on Systems, Man, and Cybernetics, vol. SMC-9, No. 1, Jan. 1979.

Zhang Y. et al., "Classification of Fruits Using Computer Vision and a Multiclass Support Vector Machine," Sensors 2012, 12, ISSN 1424-8220.

Krizhevsky, A., et al., "ImageNet Classification with Deep Convolutional Neural Networks," Part of Advances in Neural Information Processing Systems 25 (NIPS 2012).

Tai, M.W., et al., "Depth from Combining Defocus and Correspondence using Lightheld Cameras," In Proceedings of International Conference on Computer Vision (ICCV), 2013.

Dansereau, D.G., "The Matlab Light Field Toolbox v0.4," http://marine.acfr.usyd.edu.au/research/plenoptic-imaging/, accessed Oct. 4, 2015.

Ouyang, B., et al., "Compressive Line Sensing Underwater Imaging System," Journal of Optical Engineering, special adition on Ocean Optics, vol. 53, issue 5, 2014.

Bok, Y., "Geometric Calibration of Micro-Lens-Based Light-Field Cameras," Proceedings of European Conference on computer Vision (ECCV) 2014.

Ouyang, B., et al., "Visualization for Multi-Static Underwater LLS System Using Image Based Rendering," IEEE Journal of Oceanic Engineering, vol. 38, pp. 566-580, 2013.

Perwass, C.,"Raytrix Light Field Cameras for Metric 3D Measurements," (Raytrix_LightFieldcamera_2015_print1.pdf) accessed Jan. 20, 2013.

Peck, J., "Designing a Housing and Mount for an Underwater Light Field Rendering Camera System," 2013 summer intern report.

Hasanbelliu, E., et al., "Online Learning Using a Bayesian Surprise Metric," Proc. IEEE World Conf. Comp. Intell. (WCCI-2012), 2012.

Levoy, M., et al., "Light Field Rendering," SIGGRAPH'96, pp. 31-42, 1996.

Laws, K., "Rapid Texture Identification," SPIE vol. 238, pp. 376-380, 1980.

Hartigan, J.A., et al., "Algorithm AS 136: A K-Means Clustering Algorithm," Journal of the Royal Statistical Society, Series C 28 (1): 100-108, 1979.

* cited by examiner (a)

(b)

SYSTEMS AND METHODS FOR LARVAL FISH ENUMERATION AND GROWTH MONITORING

CROSS-REFERENCE TO RELATED APPLICATIONS

The present application claims priority to U.S. Provisional Patent Application Ser. No. 62/452,595 filed on Jan. 31, 2017, the entirety of which is incorporated herein by reference.

BACKGROUND

Statement of the Technical Field

The present disclosure concerns generally to culture tank systems. More particularly, the present invention relates to implementing systems and methods for larval fish enumeration and growth monitoring.

Description of the Related Art

Effective larval fish enumeration and growth monitoring in culture tanks is critical in many aquaculture applications. The larval enumeration and growth monitoring in culture tanks is a major factor for optimizing use of hatchery space and for maintaining proper densities of live feed organisms. Larval densities and live feeds densities are closely linked in culture protocols that are required to ensure proper development and survival of the larvae. One serious challenge the industry faces is that due to inefficiencies in the current discrete-physical-sampling based methods used to quantify larval densities, live feed densities can be greatly misestimated leading to overfeeding or starvation.

SUMMARY

The present invention concerns implementing systems and methods for object enumeration in a culture tank. The methods comprise: obtaining an array of two dimensional images of an illuminated scene in a culture tank; correcting non-uniform background illumination in the two dimensional ("2D") images; masking any fixtures or equipment shown in the two dimensional images; improving a color contrast between a background and object edges shown in the two dimensional images; performing a defocus analysis using the two dimensional images to generate a focus map image; generating a modified focus map image by eliminating isolated spots shown in the focus map image and merging relatively small spots with adjacent relatively large objects in the focus map image; classifying each object shown in the modified focus map image as an object of interest (e.g., larvae) or an object of no interest (e.g., bubbles and feed); counting the number of objects classified as objects of interest; and/or determining sizes of the objects classified as objects of interest.

In some scenarios, the two dimensional images are obtained by: using one or more light sources (e.g., a Spatial Modulation Device ("SMD") based strobe lights) to illuminate a scene within the culture tank; and simultaneously capturing an array of two dimensional images of the scene with a camera (e.g., a Light Field Rendering ("LFR") camera). The camera and light source are mounted on the culture tank via portable electro-mechanical rails that are adaptable to different culture tanks. At least one of the camera and light source is moved by the portable electro-mechanical rails to a first randomly determined location in the culture tank. The method may be repeated while at least one of the camera and light source is in a second randomly determined location in the culture tank.

BRIEF DESCRIPTION OF THE DRAWINGS

Embodiments will be described with reference to the following drawing figures, in which like numerals represent like items throughout the figures.

DETAILED DESCRIPTION

Figure 1:
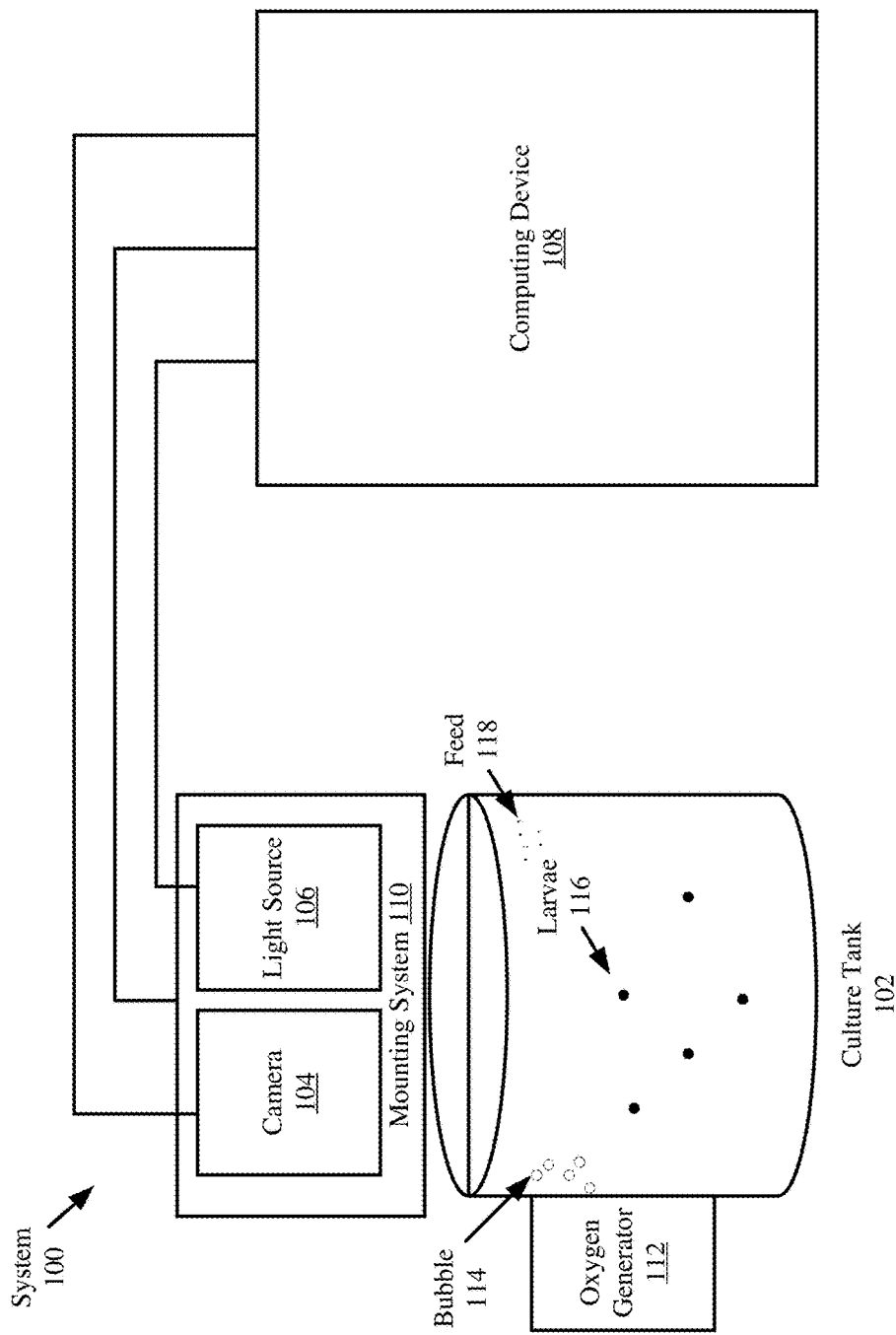
FIG. 1 is an illustration of an exemplary system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution provides a cost-effective tool for reliable object of interest enumeration and/or continuous growth monitoring in a non-intrusive manner. The present solution is discussed herein in relation to larval culture tank applications. The present solution is not limited to these applications, and can be used in any scenario where objects of interest need to be counted and monitored over time.

The present solution comprises an image acquisition front end that consists of a Light Field Rendering ("LFR") camera and a Spatial Modulation Device ("SMD") based strobe light. LFR cameras are well known in the art, and therefore will not be described in detail herein. Any known or to be known LFR camera can be used herein without limitation. In some scenarios, the LFR camera includes, but is not limited to, a Commercial-Off-The-Shelf ("COTS") Lytro LFR camera. Similarly, SMD based strobe lights are well known in the art, and therefore will not be described herein. Any known or to be known SMD based strobe light can be used herein without limitation. The SMD based strobe light enables the flexibility of adopting illumination patterns as well as the light spectrum that is optimum for the objects and/or animals under monitoring.

The LFR camera and SMD strobe light are mounted on a portable mechanical frame that can be moved among different culture tanks. A unique property of the LFR camera is that the focal surface can be adjusted arbitrarily during post-processing. The post-processing algorithm exploits this property to first synthesize the image on a focal surface within the intended field of depth. The in-focus objects are segmented such that the larval fish can be distinguished from other things represented in the image (such as feed and air bubbles). Following classification, larval population is extrapolated from the counts of the larva within the virtual "light sheet" and the larval dimension is measured.

Compared with existing techniques, the present solution enables effective segmenting, classifying and analyzing each in-focus object (e.g., larval fish, feed, bubbles, etc.), and therefore provides not only monitoring of the larval fish population and growth rate but also the potential to conduct more in-depth analysis of at least the larval fish health and feed to fish ratio through incorporating a more sophisticated classifier without requiring significant hardware investment and/or change.

While the present solution is described herein in relation to an aquaculture setting, the present solution is not limited in this regard. The present solution can also be extended to the oceanographic field. In such scenario, an open-set classifier is incorporated to facilitate the identification of previously unclassified or unknown objects, and provide the potential to develop a learning system for the oceanographic device.

Referring now to FIG. 1, there is provided an illustration of an illustrative system 100. System 100 is generally configured to monitor larval enumeration and growth in at least one culture tank 102. Culture tanks are well known in the art, and therefore will not be described in detail here. Any known or to be known culture tank can be used herein without limitation. The culture tank 102 has a shape selected in accordance with a given application. In some scenarios, the culture tank 102 has a generally circular shape for allowing uniformity of a culture environment, allowing a wide range of rotational velocities to optimize fish health and condition, and allowing rapid concentration and removal of settleable solids. The diameter of the culture tank 102 is selected in accordance with a given application. In some scenarios, the diameter is 9 meters, 10 meters or 15 meters.

The larval enumeration and growth monitoring is achieved using at least one camera 104, a light source 106 and a computing device 108. The camera 104 and light source 106 are mounted to the culture tank 102 via a mounting system 110. The camera 104 is housed in a water proof container. The camera 104 includes, but is not limited to, an LFR camera. LFR cameras are well known in the art, and therefore will not be described in detail herein. Any known or to be known LFR camera can be used herein without limitation. In some scenarios, the LFR camera 104 includes, but is not limited to, a COTS Lytro 8 GB LFR camera ("Lytro LFR camera"). The Lytro LFR camera comprises a digital camera CMOS image sensor working in conjunction with a micro-lens array containing a plurality of miniature lenses to capture light field data. The Lytro LFR camera is capable of raw image resolution of 3280×3280. Each miniature lens covers a 10×10 pixel area. Therefore, the effective LFR spatial resolution is 328×328. The LFR camera is generally configured to capture information about the light field emanating from a scene. This information includes the intensity of the light in the scene and the direction of the light rays traveling in space. This information is then used to generate an array of 2D images, each representing a 2D slice extracted from a 4D light field of a scene. Refocusing can be realized after the array of 2D images has been captured (i.e., a focal plane can be selected to be in focus at any given time).

The light source 106 is provided to illuminate a scene. Light sources are well known in the art, and therefore will not be described herein. Any known or to be known light source can be used herein. In some scenarios, the light source 106 includes, but is not limited to, an SMD based strobe light (e.g., a DLP® Lightcrafter™ available from Texas Instruments® of Dallas, Tex.). The light source 106 is housed in a water proof container. The water proof container can be the same water proof container in which the camera is housed.

Figure 2:
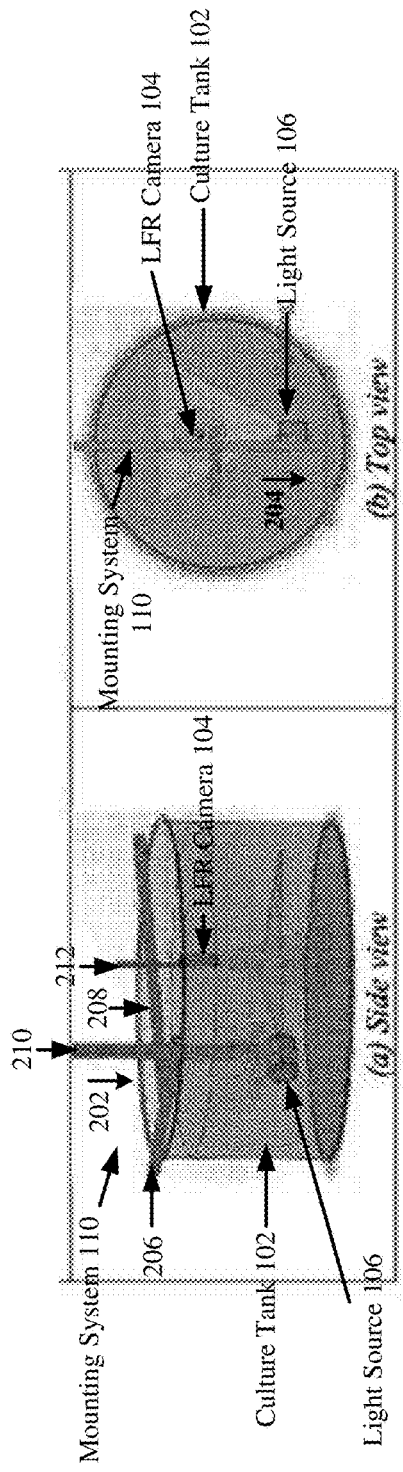
FIGS. 2 and 3 each provide an illustration that is useful for understanding an illustrative mounting system for a camera and light source in or on a culture tank.
Figure 3:
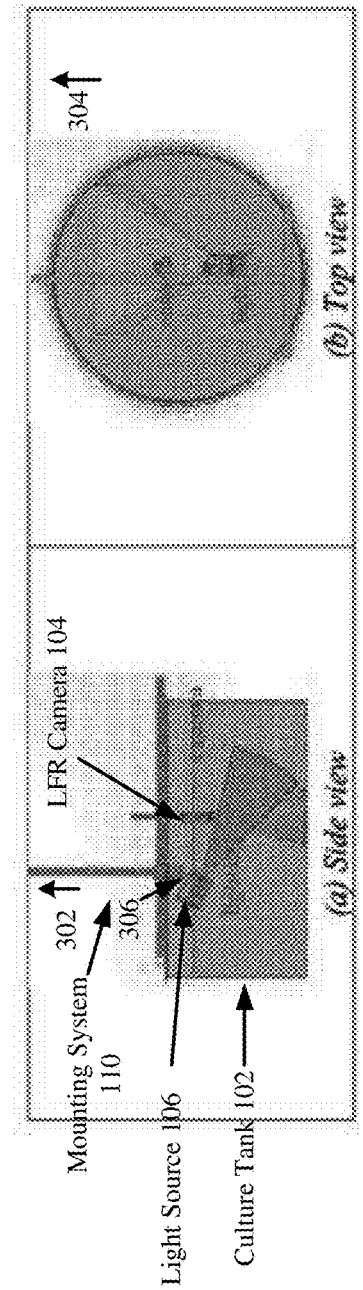

The mounting system 110 structurally supports the camera 104 and light source 106 such that one or both of them can be moved in two or three dimensions above, around and/or within the culture tank 102. FIG. 2 provides illustrations showing the mounting system 110 structurally supporting the camera 104 and light source 106 so that the water inside the culture tank 102 is illuminated from the side. FIG. 3 provides illustrations showing the mounting system 110 structurally supporting the camera 104 and light source 106 so that the water inside the culture tank 102 is illuminated from the top.

As shown by FIGS. 2 and 3, the mounting system 110 comprises at least two rigid bars 206, 208 securely coupled together (e.g., via a weld or mechanical coupler (e.g., screws)) which provide a structural base. At least two additional bars 210, 212 are coupled to the structural base 206/208 for respectively supporting the camera 104 and light source 106 within the culture tank 102. This coupling of at least bar 210 is made via a coupler that allows the light source 106 to be moved in opposing vertical directions 202, 302 and opposing horizontal directions 204, 304. The coupler includes, but is not limited to, ball bearings, rotatable joints, linkages, clamps, rollers, and/or tracks. The light source 106 is also configured to rotate about a pivot point 306. The bars 206-212 are formed of a rust free or rust resistant material (e.g., stainless steel or plastic) that is safe for the larvae. The light source's movement is controlled by the computing device 108 of FIG. 1.

Figure 4:
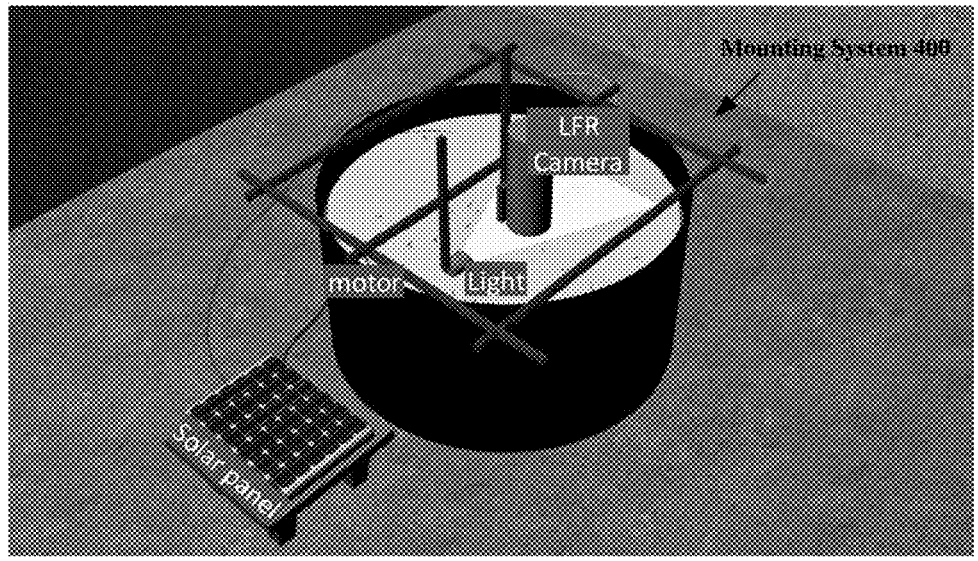
FIG. 4 is an illustration that is useful for understanding another illustrative mounting system for a camera and light source in or on a culture tank.
Figure 5:
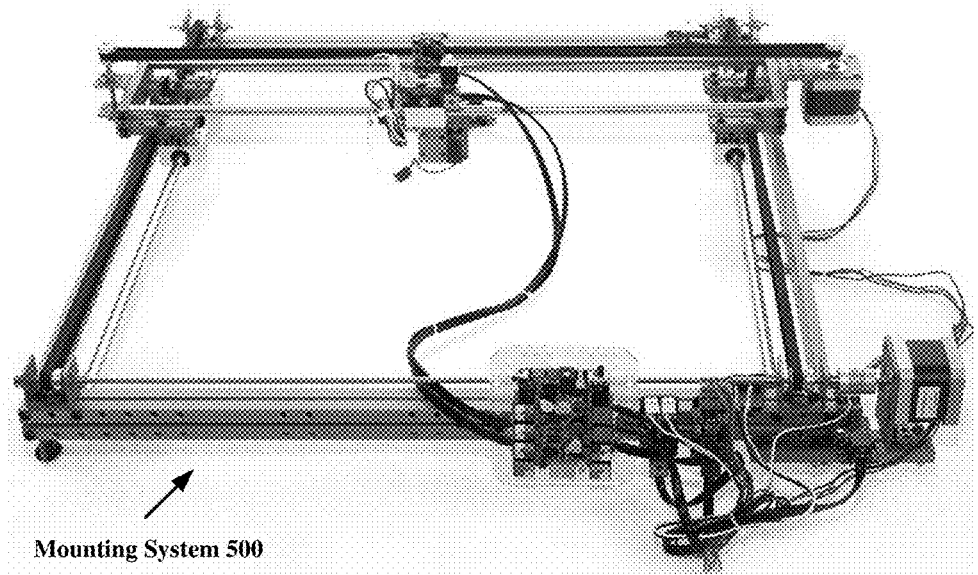
FIG. 5 is an illustration of another illustrative mounting system for a camera and light source in or on a culture tank.

Alternative architectures for the mounting system are provided in FIGS. 4-5. As shown in FIGS. 4-5, the mounting systems 400, 500 includes electro-mechanical robotic rails system including components such as motors and robotic arms. The electro-mechanical robotic rails system is powered by a power source. The power source can include, but is not limited to, a battery, a capacitor, and/or an AC mains. The battery and/or capacitor can be charged using harvested energy (e.g., ambient light via a solar panel). This is advantageous in the larvae hatchery since the normal operations of such battery require 24 hour continuous strong lighting. The electro-mechanical robotic rails system is configured to move the fixture of the camera and/or light source slowly and randomly throughout the culture tank. The random sampling enables the system to mitigate uneven distributions of the larvae in the culture tank.

Figure 6:
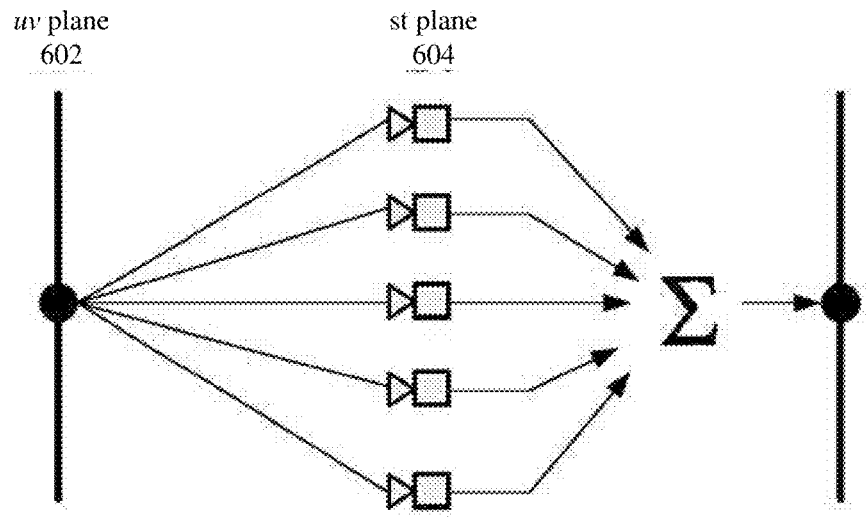
FIG. 6 provides illustrations that are useful for understanding Synthetic Aperture Imaging ("SAI") of a camera.
Figure 6:
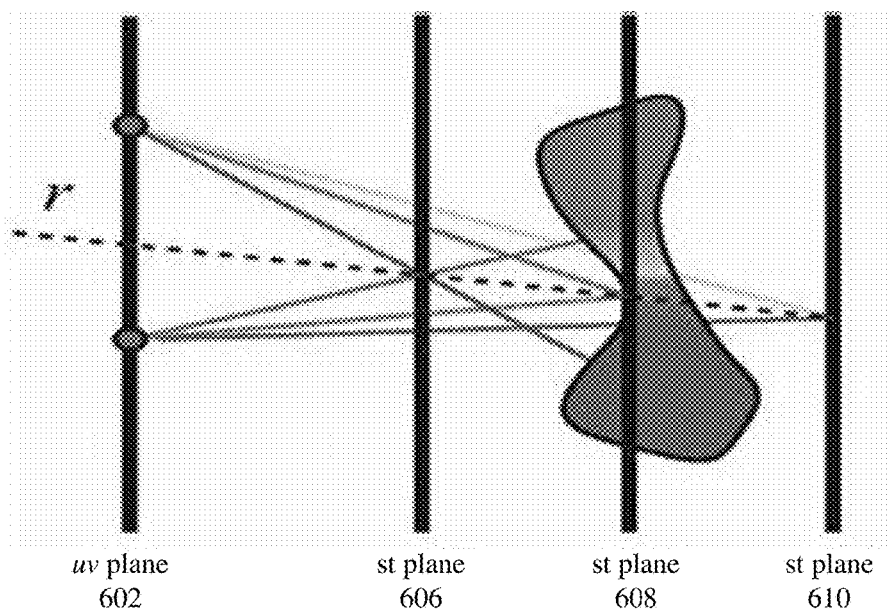

Referring again to FIG. 1, the light source 106 emits light to illuminate a scene inside the culture tank 102. While the scene is being illuminated, the camera 104 captures an array of 2D images simultaneously to build a light slab that parameterizes a 4D plenoptic function describing a target in the free space outside of a convex hull. In the camera 104, the array of 2D images is considered as a virtual lens with a narrow depth of field. Each image represents a sampling point on the virtual lens. To focus on a chosen focal plane, operations are performed to sample the light rays from each image (i.e., uv plane 602 of FIG. 6) that pass through the same pixel on the focal plane (i.e., st plane 604, 606, 608 or 610 of FIG. 6). Changing focal distance is equivalent to choosing a different focal plane during post-processing. This ability to arbitrarily refocus during post-processing or Synthetic Aperture Imaging ("SAI") is one of the most attractive features of the camera 104. A fundamental aspect of the present solution is to reliably monitor larvae by detecting the (in-focus) larvae within a volume.

Figure 7:
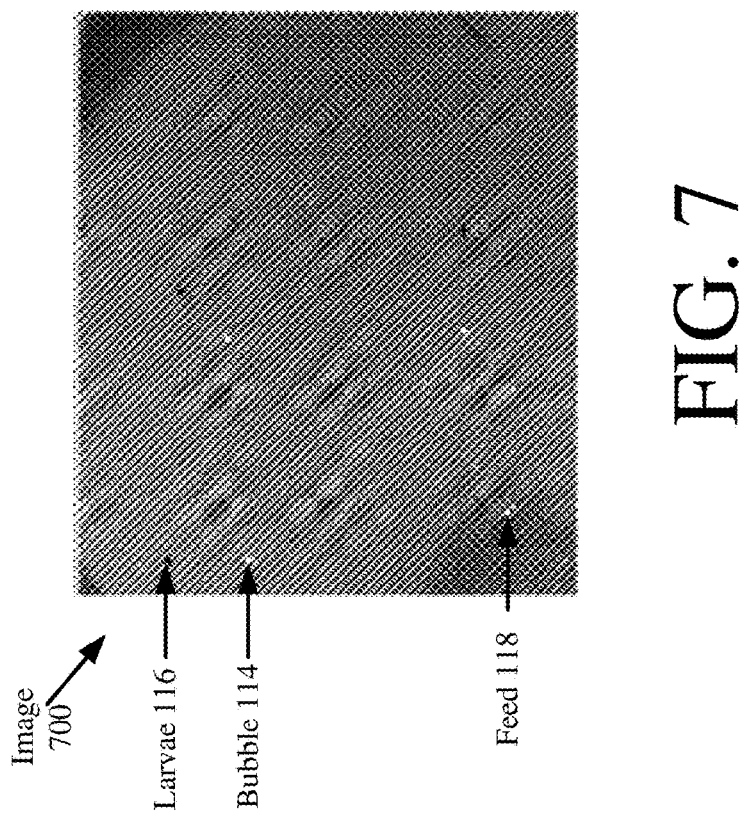
FIG. 7 is an image showing larvae and clutter.

Notably, as shown in FIG. 7, the clutter (e.g., bubbles 114 produced by an oxygen generator 112 and feed 118) appears in each image 700 as bright spots (since they cause specular reflection of the emitted light). In contrast, the larvae 116 appears in the images as relatively dark spots.

Figure 8:
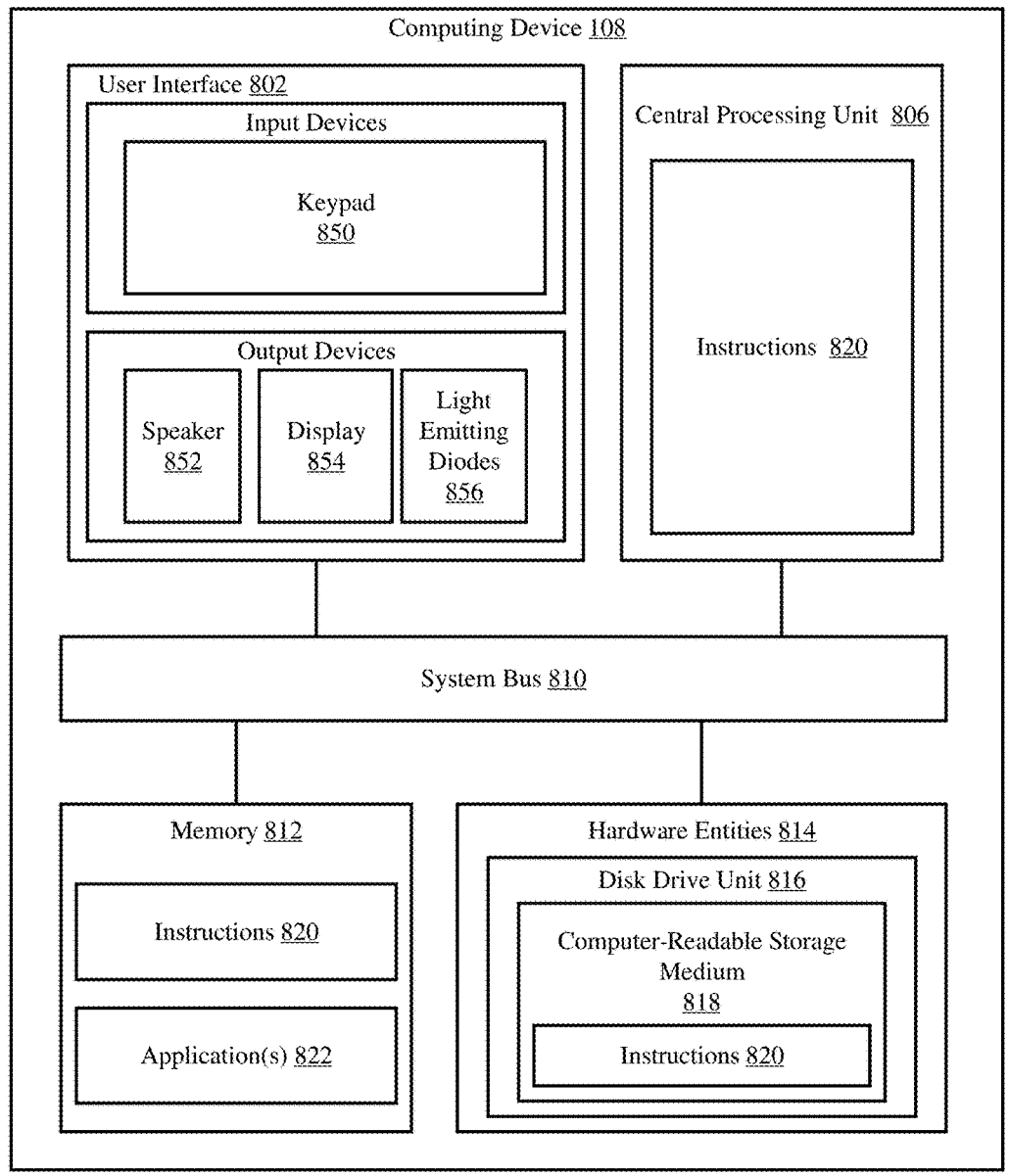
FIG. 8 is an illustration of an illustrative computing device.

Referring now to FIG. 8, there is provided a detailed block diagram of an illustrative architecture for the computing device 108. The computing device 108 may include more or less components than those shown in FIG. 8. However, the components shown are sufficient to disclose an illustrative embodiment implementing the present solution. The hardware architecture of FIG. 8 represents one embodiment of a representative server configured to facilitate inventory counts and management. As such, the computing device 108 of FIG. 8 implements at least a portion of a method for larval fish enumeration and growth monitoring in accordance with the present solution.

Some or all the components of the computing device 108 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 108 comprises a user interface 802, a CPU 806, a system bus 810, a memory 812 connected to and accessible by other portions of the computing device 108 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the computing device 108.

At least some of the hardware entities 814 perform actions involving access to and use of memory 812, which can be a RAM, a disk driver, a Secure Digital ("SD") card, and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 108. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 108 and that cause the computing device 108 to perform any one or more of the methodologies of the present disclosure.

In some scenarios, the hardware entities 814 include an electronic circuit (e.g., a processor) programmed for facilitating larval fish enumeration and growth monitoring. In this regard, it should be understood that the electronic circuit can access and run a software application 822 installed on the computing device 108. The software application 822 is generally operative to facilitate: control of the mounting system's electronic components; perform image processing operations; categorize items shown in the images as objects of interest and/or clutter; count a total number of objects of interest represented in one or more images; and/or determine sizes of the objects of interest. Other functions of the software application 822 will become apparent as the discussion progresses.

Figure 9:
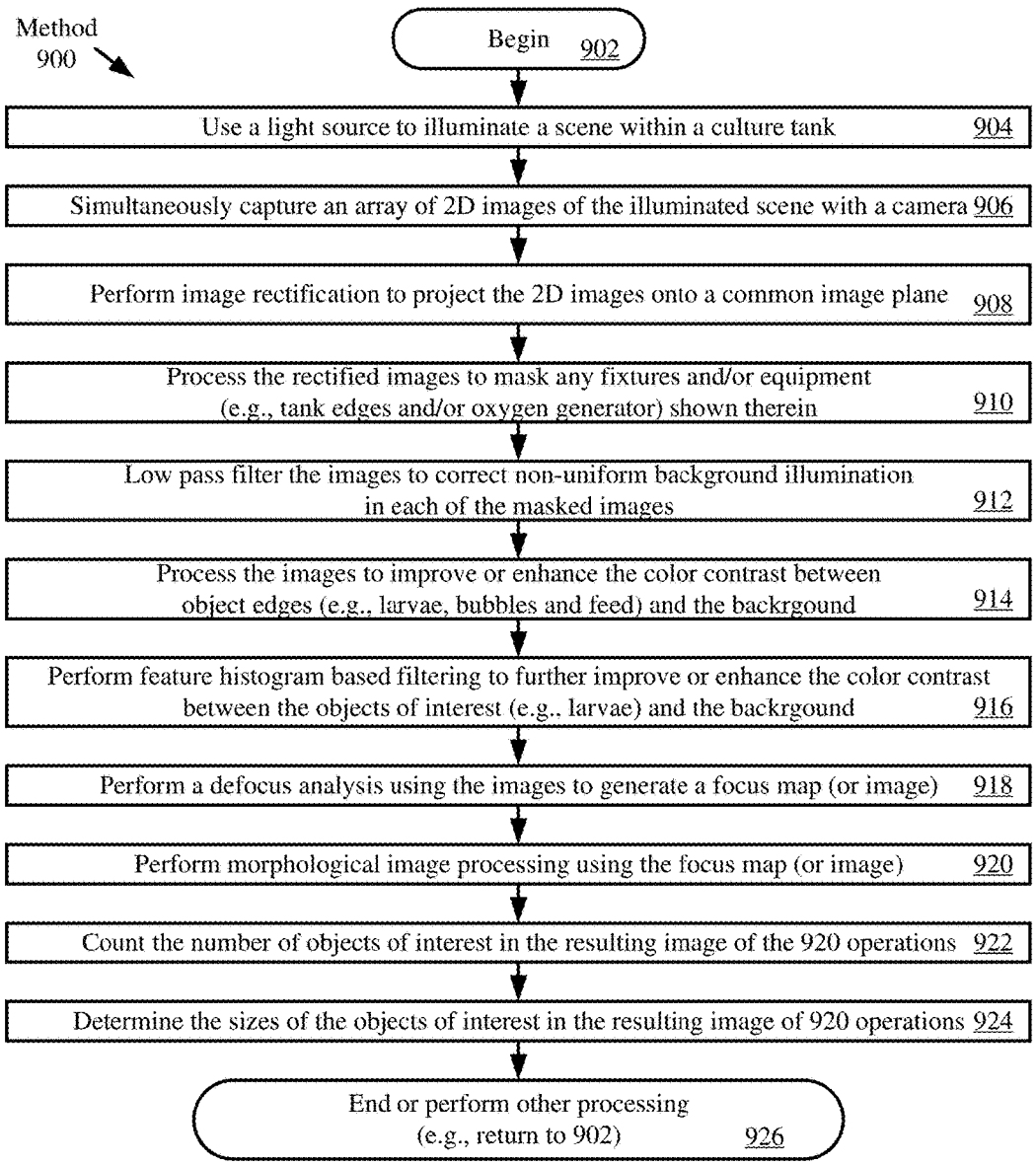
FIG. 9 is a flow diagram of an illustrative method for determining the number and size of objects of interest (e.g., larvae) in a confined space (e.g., a tank).

Referring now to FIG. 9, there is provided a flow diagram of an illustrative method 900 for larval fish enumeration and growth monitoring. Method 900 comprises various operations 904-924. The present solution is not limited to the order in which these operations are performed. Also, the operations of 908-924 are performed by a computing device (e.g., computing device 108 of FIG. 1). In this regard, the computing device comprises a processor (e.g., CPU 806 of FIG. 8) and a non-transitory computer-readable storage medium (e.g., CPU 806, memory 812 and/or hardware entities 814 of FIG. 8) comprising programming instructions (e.g., instructions 820) that are configured to cause the processor to implement at least a portion of method 900.

Method 900 begins with 902 and continues with 904 where a light source (e.g., light source 106 of FIG. 1) is used to illuminate a scene within a culture tank (e.g., culture tank 102 of FIG. 1). The light source is positioned relative to the culture tank in accordance a particular application. For example, the light source and camera are moved to a randomly selected location. The relative distance and orientation of the camera and light source remain unchanged during these movements. The random selection is made using a chaotic, random or pseudo-random number algorithm. Such algorithms are well known in the art, and therefore will not be described herein. Any known or to be known chaotic, random or pseudo-random number algorithm can be used herein without limitation.

Next in 906, a camera (e.g., camera 104 of FIG. 1) simultaneously captures an array of 2D images of the illuminated scene. The camera is positioned relative to the culture tank and light source in accordance a particular application. For example, the camera is moved to a predefined location or a randomly selected location. The random selection is made using a chaotic, random or pseudo-random number algorithm. Such algorithms are well known in the art, and therefore will not be described herein. Any known or to be known chaotic, random or pseudo-random number algorithm can be used herein without limitation.

Each image J(x) is (1) a function of the product of illumination i(x) and the reflectance T(x) and (2) corrupted by noise n. The following Mathematical Equation (1) defines the image J(x) in mathematical terms.

$$J(x)=i(x)T(x)+n \qquad (1)$$

Notably, the 2D images can be refocused at any given time by focal plane selection. By adjusting the focal plane, the low-frequency light field corresponding to the illumination is approximated. An illustrative image for a selected focal plane is shown in FIG. 10(a).

For each focal plane (e.g., st plane 604, 606, 608 or 610 of FIG. 6), the raw 2D images (e.g., image 700 of FIG. 7) are rectified in 908. The image rectification is performed to project the 2D images onto a common plane. An illustrative rectified image is shown in FIG. 10(b). Image rectification techniques are well known in the art, and therefore will not be described in detail herein. Any known or to be known image rectification technique can be used herein without limitation. In some scenarios, the image rectification is implemented in the camera. For example, the COTS Lytro LFR camera includes hardware and/or software implementing image rectification. The image rectification employed by the COTS Lytro LFR camera is not described herein since it is known in the art. The present solution is not limited to the image rectification technique employed by the COTS Lytro LFR camera.

Upon completing the image rectification, operations are performed in 910 to mask any fixtures and/or equipment shown in the rectified images. The masking is achieved by: accessing masking information stored in a datastore (e.g., memory 812 of FIG. 8 or a remote database) defining a known camera location, a known camera pointing direction, known locations of any fixture and/or equipment, and known boundary points of any fixture and/or equipment; using the masking information to identify areas in each image which comprise at least a portion of a fixture and/or a piece of equipment; and adjusting Red, Green and Blue ("RGB") color values for each pixel in the identified areas such that the same appears darker (e.g., black). An illustrative masked image is shown in FIG. 10(c).

In 912, each masked image is low pass filtered to correct for non-uniform background illumination, i.e., to make the illumination of each image more even. The non-uniform illumination is achieved by normalizing the brightness across a masked image. The brightness across the masked image is normalized by: determining an average background pixel value lm_avg for each pixel using respective pixel values of the plurality of images taken at the same location; applying a Finite Impulse response ("FIR") lowpass filter to an image defined by the average background pixel values lm_avg to generate filtered background pixel values lm_background; and removing a bias (uneven background lighting) in the current image by dividing each current pixel value lm_current by the respective filtered background pixel value. The operations of 912 for a single pixel are defined by the following Mathematical Equations (2)-(4).

$$lm\_avg \qquad (2)$$

$$lm\_background=FIR(lm\_avg) \qquad (3)$$

$$lm\_current'=lm\_current/lm\_background \qquad (4)$$

An illustrative low pass filtered image is shown in FIG. 10(d). FIR lowpass filters are well known in the art, and therefore will not be described herein. Any known or to be known FIR lowpass filter can be used herein without limitation.

The low pass filtered images are further processed in 914 to improve or enhance the color contrast of the object edges (e.g., larvae, bubbles and feed) against the background. The color contrast is improved or enhanced via harmonic filtering. Harmonic filtering is well known in the art, and therefore will not be described herein. Any known or to be known harmonic filtering technique can be used herein without limitation. In some scenarios, the harmonic filtering comprises a harmonic filtering technique described in a document entitled "Image Enhancement by Stochastic Homomorphic Filtering" written by Robert W. Fries and James W. Modestino ("Fries"). Fries harmonic filtering technique (a) enhances rapid local variations due to object boundaries and (b) deemphasizes more gradual changes such as those which occur as a result of shadows while simultaneously controlling the degrading effect due to salt-and-peeper noise. In this regard, Fries harmonic filtering technique involves: considering an observed image intensity $s_0(x)$ as the product of three components: the true reflectivity of the objects in the image r(x); the non-constant illumination function i(x); and a white noise component n(x). That is, $$s_0(x)=r(x)\cdot i(x)\cdot n(x) \qquad (5)$$

The logarithm of both sides of Mathematical Equation (5) is taken whereby a density image is produced. The density image is defined by the following Mathematical Equation (6).

$$g(x) \triangleq \ln s_0(x)=f_r(x)+f_i(x)+f_n(x) \qquad (6)$$

where $$f_r(x) \triangleq \ln r(x) \qquad (7)$$

$$f_i(x)=\ln i(x), \text{ and} \qquad (8)$$

$$f_n(x)=\ln n(x). \qquad (9)$$

The true image is extracted from the illumination and noise using Wiener filtering and/or linear least mean-square filtering, where the signal is $f_r(x)$ and the noise is $f_i(x)+f_n(x)$. The result of this filtering is then passed through an exponentiation operation which yields an estimate $\hat{r}(x)$ of the true image as represented by the reflectance process $r(x)$. The present solution is not limited in this regard.

In underwater imaging, multiplicative noise (such as the Poisson noise) is the dominant noise. Therefore, when applying homomorphic filtering, a logarithm is applied to each input pixel value lm_current followed by linear filtering. In some scenarios, the domain of image data is converted from a digital domain to a frequency domain. An FIR high pass filter is applied to improve the contrast of the edges of the larvae objects against the background. An exponential function is then applied to convert back the image data to the original digital domain. This process is defined by the following Mathematical Equations (10)-(12).

$$\text{lm\_log}=\ln(\text{lm\_current}) \quad (10)$$

$$\text{lm\_proc}=\text{FIR}(\text{lm\_log}) \quad (11)$$

$$\text{lm\_exp}=\exp(\text{lm\_proc}) \quad (12)$$

The present solution is not limited to the particulars of this example.

Next in 916, feature histogram-based filtering is performed to further improve or enhance the color contrast between object edges (e.g., larvae, bubbles and feed) and the background. In some scenarios, the feature histogram-based filtering comprises the technique described in a document entitled "A Threshold Selection Method from Gary-Level Histograms" written by Nobuyuki Otsu ("Otsu"). This technique involves: computing an image histogram h; computing an accumulated distribution of the histogram ch; determining a threshold percentage value th (e.g., 90%) of ch that are to be set to zero; empirically identify pixels of the image that are to have non-zero values (e.g., only 10% of the pixels are to have non-zero values); and setting the pixel values to zero for the pixels which were not empirically identified. This feature histogram-based filtering technique is described below by Mathematical Equations (13)-(16).

$$h=\text{hist}(\text{lm\_exp}) \quad (13)$$

$$ch=\text{cumsum}(h) \quad (14)$$

$$th=90\% \text{ of } ch \quad (15)$$

$$\text{lm\_hist}(x,y)=\text{lm\_exp}(x,y), \text{ if } \text{lm\_exp}(x,y) \geq th\ 0, \text{ if } \text{lm\_exp}(x,y)< \quad (16)$$

Figure 10:
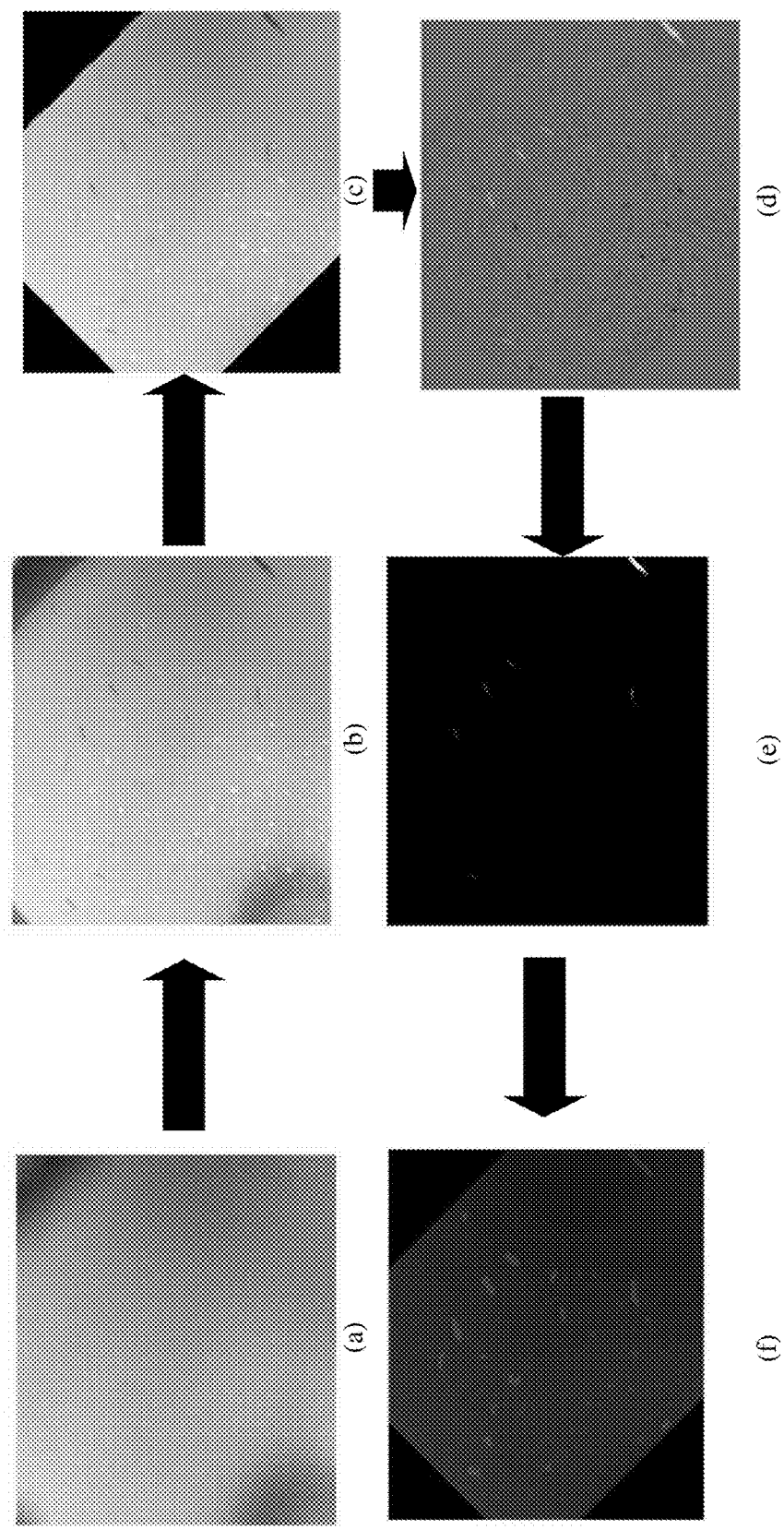
FIG. 10 shows a plurality of images that are useful for understanding image processing operations performed in the method shown in FIG. 9.

The present solution is not limited in this regard. A resulting image of the feature histogram-based filtering is shown in FIG. 10(*e*).

Upon completing the feature histogram-based filtering, a defocus analysis is performed in 918 using the resulting image to generate a focus map (or image). Defocus analysis is well known in the art, and therefore will not be described in detail herein. Any known or to be known defocus analysis can be used herein without limitation. In some scenarios, the defocus analysis comprises the defocus analysis described in a document entitled "Depth From Combining Defocus And Correspondence Using Light-Field Cameras" written by Michael W. Tao et al. ("Tao"). The focus map (or image) resulting from this defocus analysis is an image containing the in-focus objects at a range of the focus depths. The spatial gradient of the focus map (or image) is defined as the defocus response $$G_\alpha(x)=\overline{V}l_\alpha(x). \quad (17)$$

The focal plane is the peak of the defocus response. The present solution is not limited in this regard.

Figure 11:
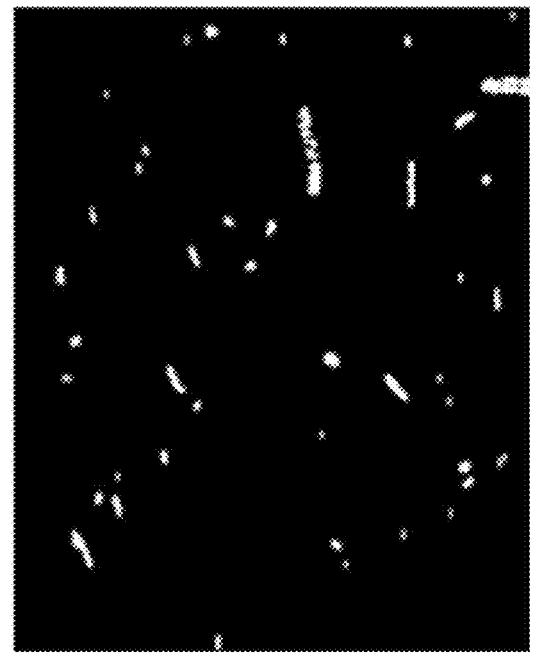
FIG. 11 shows two images that are useful for understanding a morphological image processing technique.
Figure 11:
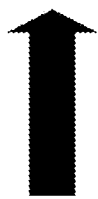
Figure 11:
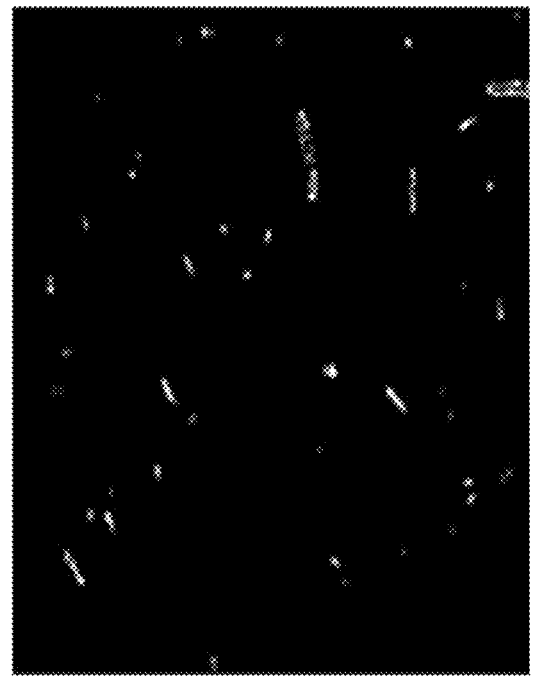

Subsequently in 920, morphological image processing is performed using the focus map. Morphological image processing is well known in the art, and therefore will not be described in detail herein. Any known or to be known morphological image processing technique can be used herein without limitation. In some scenarios, the morphological image processing involves eliminating small totally isolated spots on an input image and merging relatively small spots with adjacent relatively large objects. An illustrative input image to the morphological image process is shown in FIG. 11(*a*), and a resulting image of the morphological image process is shown in FIG. 11(*b*).

Upon completing 920, 922 is performed where the number of objects of interest in the resulting image of the 920 operations are counted. This counting is achieved by: classifying each object in the resulting image (e.g., the image shown in FIG. 11(*b*)) as objects of interest (e.g., larvae) or objects of no interest (e.g., non-larvae objects such as bubbles and feed); and determining a total number of objects classified as objects of interest (e.g., larvae). The object classification is achieved using a technique disclosed in a document entitled "Image Segmentation Using K-Mean Clustering For Finding Tumor In Medical Application" written by Piyush Patel et al. ("Patel"). In some scenarios, the objects can be classified based on using a Support Vector Machine ("SVM") based classifier approach such as the approach written by Yudong Zhang and Lenan Wu in a document entitled "Classification of Fruits Using Computer Vision and a Multiclass Support Vector Machine". The SVM based classifier can be trained using object contour, a skew ratio, and/or an object color as input. This trained framework can then be used in object classification. Alternatively, a Conventional Neural Network ("CNN") for image classification can be used. The CNN can include, but is not limited to, the CNN disclosed in a document entitled "ImageNet Classification With Deep Convolutional Neural Networks" written by Krizhevsky et al. In 924, the sizes of the objects of interest (i.e., the larvae) are also determined. Subsequently, 926 is performed where method 900 ends or other processing is performed (e.g., return to 904).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for object enumeration in a culture tank, comprising:
   obtaining an array of two dimensional images of an illuminated scene in the culture tank;

correcting non-uniform background illumination in the two dimensional images;
improving a color contrast between a background and object edges shown in the two dimensional images;
performing a defocus analysis using the two dimensional images to generate a focus map image;
generating a modified focus map image by eliminating isolated spots shown in the focus map image and merging small spots with adjacent large objects in the focus map image;
classifying each object shown in the modified focus map image as an object of interest or an object of no interest, wherein the object of interest comprises larvae and the object of no interest comprises bubbles and feed; and
counting a number of objects classified as objects of interest.

2. The method according to claim 1, wherein the two dimensional images are obtained by:
using a light source to illuminate a scene within the culture tank; and
simultaneously capturing an array of two dimensional images of the scene with a camera.

3. The method according to claim 2, wherein the camera comprises a Light Field Rendering ("LFR") camera.

4. The method according to claim 2, wherein the light source comprises one or more Spatial Modulation Device ("SMD") based strobe lights.

5. The method according to claim 2, wherein the camera and light source are mounted on the culture tank via portable electro-mechanical rails that are adaptable to different culture tanks.

6. The method according to claim 5, wherein at least one of the camera and light source is moved by the portable electro-mechanical rails to a first randomly determined location in the culture tank.

7. The method according to claim 6, wherein the method is repeated while at least one of the camera and light source is in a second randomly determined location in the culture tank.

8. The method according to claim 1, further comprising masking any fixtures or equipment shown in the two dimensional images prior to when the color contrast is improved.

9. The method according to claim 1, further comprising determining sizes of the objects of interest.

10. A system, comprising:
a processor; and
a non-transitory computer-readable storage medium comprising programming instructions that are configured to cause the processor to implement a method for object enumeration in a culture tank, wherein the programming instructions comprise instructions to:
obtain an array of two dimensional images of an illuminated scene in the culture tank;
correct non-uniform background illumination in the two dimensional images;
improve a color contrast between a background and object edges shown in the two dimensional images;
perform a defocus analysis using the two dimensional images to generate a focus map image;
generate a modified focus map image by eliminating isolated spots shown in the focus map image and merging small spots with adjacent large objects in the focus map image;
classify each object shown in the modified focus map image as an object of interest or an object of no interest, wherein the object of interest comprises larvae and the object of no interest comprises bubbles and feed; and
count a number of objects classified as objects of interest.

11. The system according to claim 10, wherein the two dimensional images are obtained using a light source to illuminate a scene within the culture tank, and a camera to simultaneously capture an array of two dimensional images of the scene.

12. The system according to claim 11, wherein the camera comprises a Light Field Rendering ("LFR") camera.

13. The system according to claim 11, wherein the light source comprises one or more Spatial Modulation Device ("SMD") based strobe lights.

14. The system according to claim 11, wherein the camera and light source are mounted on the culture tank via portable electro-mechanical rails that are adaptable to different culture tanks.

15. The system according to claim 14, wherein at least one of the camera and light source is moved by the portable electro-mechanical rails to a first randomly determined location in the culture tank.

16. The system according to claim 15, wherein the method is repeated while at least one of the camera and light source is in a second randomly determined location in the culture tank.

17. The system according to claim 10, wherein the programming instructions further comprise instructions to mask any fixtures or equipment shown in the two dimensional images prior to when the color contrast is improved.

18. The system according to claim 10, wherein the programming instructions further comprise instructions to determine sizes of the objects of interest.

* * * * *